United States Patent
Babiychuk et al.

(10) Patent No.: US 12,287,989 B2
(45) Date of Patent: Apr. 29, 2025

(54) MULTI-INTERFACE CONTAINER STORAGE INTERFACE DRIVER DEPLOYMENT MODEL

(71) Applicant: Dell Products L.P., Round Rock, TX (US)

(72) Inventors: Oleksandr Babiychuk, Ottawa (CA); Thomas L. Watson, Richardson, TX (US); Alykhan Nathoo, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 18/103,643

(22) Filed: Jan. 31, 2023

(65) Prior Publication Data

US 2024/0256189 A1    Aug. 1, 2024

(51) Int. Cl.
*G06F 3/06* (2006.01)
(52) U.S. Cl.
CPC .......... *G06F 3/0665* (2013.01); *G06F 3/0604* (2013.01); *G06F 3/067* (2013.01)
(58) Field of Classification Search
CPC ....... G06F 3/0665; G06F 3/0604; G06F 3/067
See application file for complete search history.

(56) References Cited

U.S. PATENT DOCUMENTS

| | | | |
|---|---|---|---|
| 10,659,533 B1 * | 5/2020 | Zhao | G06F 12/0862 |
| 11,416,450 B1 | 8/2022 | Du et al. | |
| 11,579,780 B1 * | 2/2023 | Tsuchiya | G06F 3/0619 |
| 2021/0271565 A1 * | 9/2021 | Bhavanarushi | G06F 9/45558 |
| 2022/0276929 A1 | 9/2022 | Prashant et al. | |
| 2022/0308849 A1 | 9/2022 | Kumar et al. | |
| 2023/0254284 A1 * | 8/2023 | McCord | H04L 41/12 726/15 |
| 2024/0037120 A1 * | 2/2024 | Xu | G06F 16/27 |
| 2024/0134526 A1 * | 4/2024 | Watson | G06F 3/0673 |
| 2024/0143366 A1 * | 5/2024 | Frosi | G06F 9/45558 |
| 2024/0211276 A1 * | 6/2024 | Vohra | G06F 9/45558 |

OTHER PUBLICATIONS

Github, "Dell Container Storage Modules (CSM)" https://github.com/dell/csm, Accessed Aug. 8, 2022, 3 pages.

(Continued)

*Primary Examiner* — Hiep T Nguyen
(74) *Attorney, Agent, or Firm* — Ryan, Mason & Lewis, LLP

(57) ABSTRACT

Techniques for container environment management are disclosed. For example, a method comprises deploying a first container storage interface driver, wherein the first container storage interface driver comprises multiple interfaces and is configured to: (i) receive a first request from a host configured to execute an application program, wherein the first request is related to a first storage volume associated with a storage system; (ii) receive a second request from a second container storage interface driver configured to provide an additional functionality with respect to the first container storage interface driver, wherein the second request is related to a second storage volume associated with the storage system; and (iii) send the first request and the second request to the storage system.

20 Claims, 7 Drawing Sheets

(56) References Cited

OTHER PUBLICATIONS

N. Yehia, "Kubernetes Self Remediation (AKA Poison Pill)," https://www.openshift.com/blog/kubernetes-self-remediation-aka-poison-pill, Nov. 18, 2020, 4 pages.
N. Yehia, "Poison Pill k8s Node Remediation," https://github.com/poison-pill/poison-pill, Dec. 30, 2020, 2 pages.
Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.
G. Saenger et al., "Pod Safety, Consistency Guarantees, and Storage Implications," https://github.com/kubernetes/community/blob/master/contributors/design-proposals/storage/pod-safety.md, Oct. 2016, 10 pages.
U.S. Appl. No. 17/970,676 filed in the name of Thomas L. Watson on Oct. 21, 2022, and entitled "Virtual Container Storage Interface Controller."

* cited by examiner

MULTI-INTERFACE CONTAINER STORAGE INTERFACE DRIVER DEPLOYMENT MODEL

FIELD

The field relates generally to information processing systems, and more particularly to management of container environments.

BACKGROUND

Information processing systems increasingly utilize reconfigurable virtual resources to meet changing user needs in an efficient, flexible and cost-effective manner. For example, computing and storage systems implemented using virtual resources in the form of containers have been widely adopted. Such containers may be used to provide at least a portion of the virtualization infrastructure of a given information processing system. However, significant challenges arise in managing container environments especially in the case of existing limitations with container storage interface drivers used to respectively interface with storage systems.

SUMMARY

Illustrative embodiments provide a multi-interface container storage interface driver deployment model for a container environment.

For example, in an illustrative embodiment, a method comprises deploying a first container storage interface driver, wherein the first container storage interface driver comprises multiple interfaces and is configured to: (i) receive a first request from a host configured to execute an application program, wherein the first request is related to a first storage volume associated with a storage system; (ii) receive a second request from a second container storage interface driver configured to provide an additional functionality with respect to the first container storage interface driver, wherein the second request is related to a second storage volume associated with the storage system; and (iii) send the first request and the second request to the storage system.

In further illustrative embodiments, the first container storage interface driver may be further configured to receive a first response to the first request from the storage system and send the first response to the host, as well as to receive a second response to the second request from the storage system and send the second response to the second container storage interface driver.

In additional illustrative embodiments, the first container storage interface driver may be further configured to initially receive an allocation request from the host to allocate one of the first storage volume and the second storage volume and then allocate a volume as one of the first storage volume and the second storage volume. When the allocated volume is the first storage volume, the first container storage interface driver publishes the first storage volume for use by the application program. When the allocated volume is the second storage volume, the second container storage interface driver publishes the second storage volume for use by the application program.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, while existing container storage interface drivers typically only support a single instance of a container storage interface driver, illustrative embodiments extend or otherwise alter the functionality of a first container storage interface driver by routing requests through one or more additional container storage interface drivers having one or more additional functionalities and which act as a proxy for the first container storage interface driver. In one or more illustrative embodiments, a containerized workload is executed as a pod on a given node of the container environment. While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

DETAILED DESCRIPTION

Figure 1:
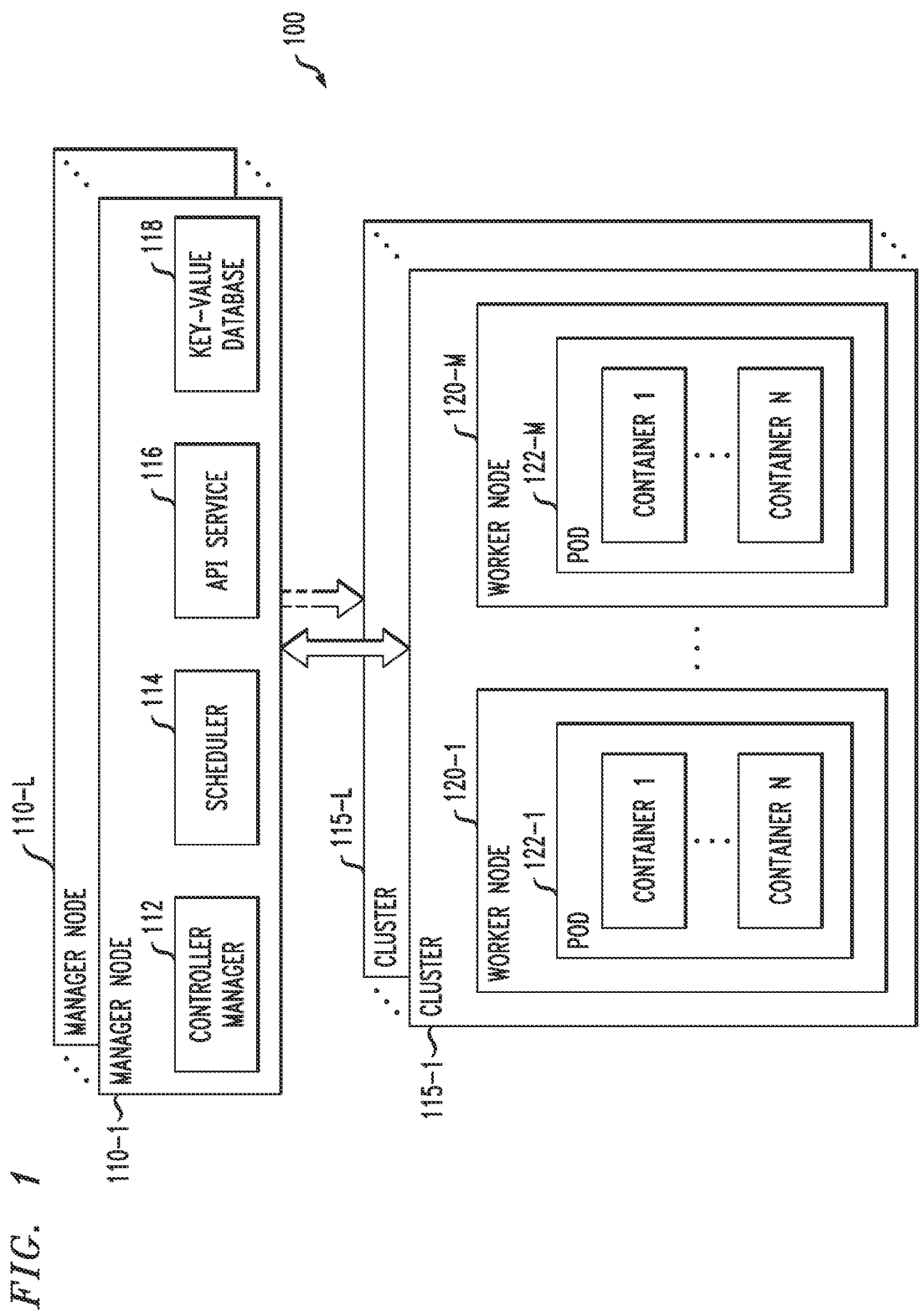
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term may illustratively be used herein, a container may be considered an executable structure or processing element comprising lightweight, stand-alone, executable software code, as well as elements needed to run the software code. More particularly, a container may be illustratively described as an operating system virtualization structure that is configurable to execute software code ranging from one or more microservices, processes, or functions to a larger application program, while containing therein all executables, binary code, libraries, configuration files, and/or the like, as may be needed/desired for execution. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122 (containerized workloads). Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
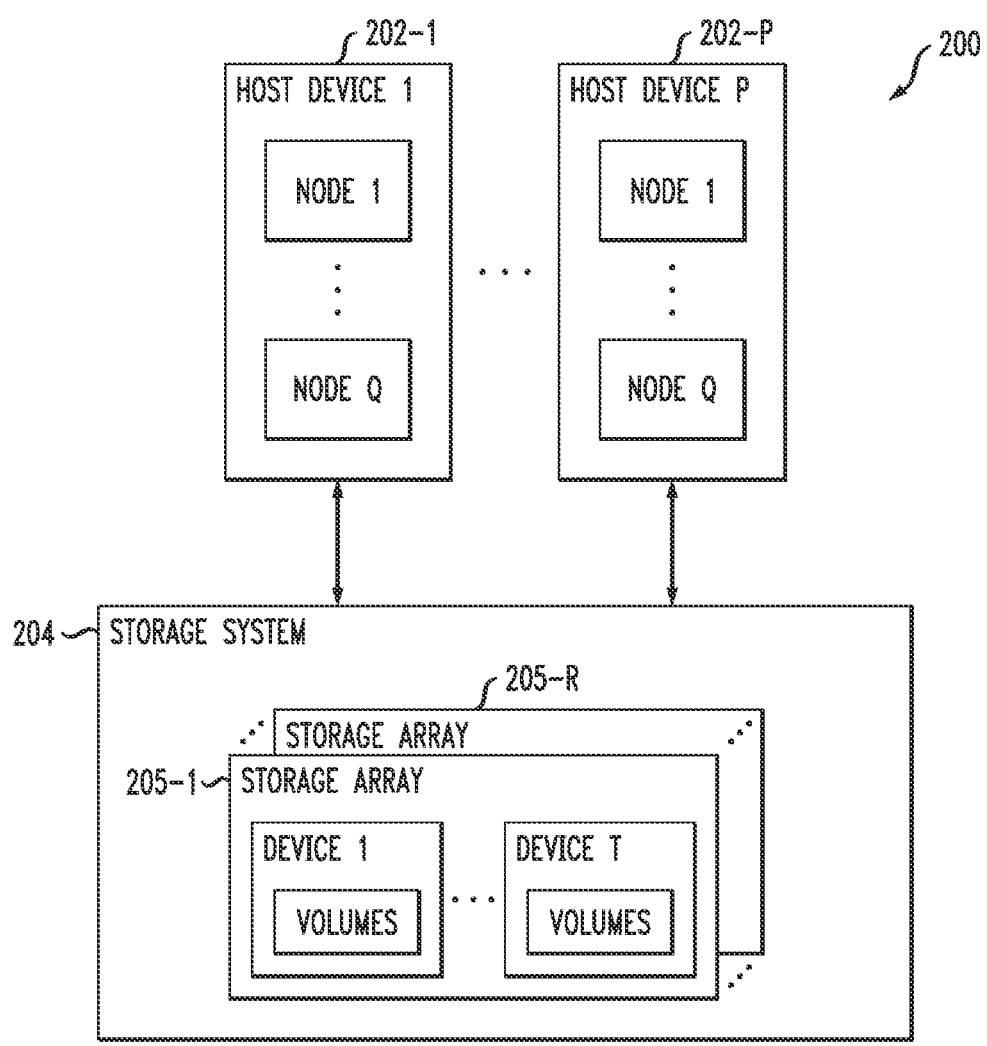
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. One non-limiting example of a host device 202 is a server. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage, and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It is also to be understood that different ones of storage arrays 205 can be configured with different interfaces and/or different semantics and can store different data types (e.g., blocks, files, objects, etc.) Storage arrays 205 can also be different storage products (storage families, storage platforms) of one or more different storage vendors.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds). Portions of information processing system 200 may also be part of one or more edge computing platforms.

It is realized herein that within container orchestration environments, such as the pod-based environment of Kubernetes, applications are deployed and able to access persistent storage volumes which are typically provisioned by Container Storage Interface (CSI) plugins of respective external storage system vendors (e.g. one or more third-party providers of components of storage system 204). A CSI plugin is typically deployed in Kubernetes as a set of components deployable on any or all nodes (e.g., manager node 110 or worker node 120) and comprises a CSI driver component (CSI driver) and one or more sidecar containers (sidecars). Sidecars typically interact with Kubernetes objects and make calls to the CSI driver to manage Kubernetes events. Sidecars typically include functions such as, but not limited to, an external-provisioner, an external-attacher, an external-snapshotter, and an external-resizer.

By way of example only, consider Dell Technologies' storage array PowerStore which has a specific CSI plugin which exposes the required array specific functions such as storage provisioning, replication and snapshotting to Kubernetes. This PowerStore CSI plugin differs from the CSI plugin for Dell Technologies' storage array PowerFlex which uses a different snapshot technology, has different replication capabilities and restrictions, and does not natively support volume clones. Accordingly, storage specific CSI drivers can comprise CSI drivers for a storage vendor's family of storage platforms, e.g., for Dell Technologies, where there can be a storage specific CSI driver for each of their storage platforms including, but not limited to, PowerFlex, PowerMax, PowerScale, PowerStore, as well as others. Additionally or alternatively, storage specific CSI drivers can comprise CSI drivers for cloud-based storage platforms including, but not limited to, block, file or object storage from Amazon Web Services (AWS), Google Cloud Platform (GCP), and Microsoft Azure.

Further, Kubernetes environments have been adapted to operate with Container Storage Modules (CSMs) which are a set of technologies that attempt to extend the capabilities of CSI plugins, improving the observability, resiliency, protection, usability, and data mobility for applications which leverage a given vendors storage portfolio. In general, CSMs extend enterprise storage capabilities to the Kubernetes environment. They also reduce management complexity so that developers can consume storage and even automate their daily operations such as provisioning, snapshotting, and replication. Additionally, CSM is open-source and freely available.

An overall goal of CSI plugins and CSM modules is to make capabilities of storage arrays available to Kubernetes applications, while facilitating the Kubernetes provisioning models that automatically deploy infrastructure (including storage) based on application profiles and storage requirements expressed as code by the application developers. This enables greater efficiency and a broader range of capabilities while still allowing automated storage provisioning.

It is realized herein that existing CSI drivers typically only support a single instance of the driver, i.e., the single instance of the CSI storage driver for the specific storage platform with which the Kubernetes platform is intended to interface.

It is further realized herein that one solution could be to deploy two instances (copies) of the same type of CSI driver where one copy gets requests from another copy which may add some extra function. However, a drawback of such a two-copy deployment is that the two copies of the same type of CSI driver on the same host device may conflict. More particularly, deploying two copies of the same type of CSI driver may lead to problems managing the storage array, i.e., unless array resources are partitioned among the two CSI drivers, both CSI drivers could simultaneously attempt conflicting changes since there is no locking between the two CSI drivers. For example, assume the first copy of the storage specific CSI driver looks at free pool storage and creates a volume and the second copy of the storage specific CSI driver performs the same operation even though the storage array does not have the capacity to accommodate both volumes. This presents a conflict condition that would adversely affect one or more applications that expect to have the two volumes created and available.

It is also realized herein that another solution could be to always proxy the CSI driver and choose how CSI requests from Kubernetes should be handled (e.g., forwarded to the main CSI driver as is or extended processing) based on storage class parameters. For example, if the volume's storage class contains the parameter encryption=true, then CSI requests for this volume will receive special handling, and if the parameter encryption=false or the parameter is absent, the proxy works in a transparent manner forwarding the request to the storage driver. However, a drawback of such a storage class parameter solution is that storage class parameters are only available in a Controller.CreateVolume CSI request, which creates additional challenges for passing those parameters or the resulting handling mode (e.g., the proxy context) to subsequent CSI requests related to the same volume. The proxy context should be persisted in the storage array, which may not be possible, and this cannot be done transparently for the storage driver without a separate persistence layer.

Illustrative embodiments overcome the above and other technical challenges associated with other container storage interface implementations by providing a multi-interface CSI driver deployment model which enables, inter alia, presentation of an altered version of the driver as a separate interface (proxy driver) without sacrificing the original interface and functionality of the storage driver. Illustrative embodiments also enable re-using the same instance of the storage driver for multiple purposes, e.g., one time as is and one or more times for proxy drivers. Accordingly, illustrative embodiments extend or alter the functionality of the storage specific CSI driver by routing CSI requests from Kubernetes through another CSI driver which acts as a proxy for the storage specific CSI driver and provides one or more additional functionalities.

Figure 3:
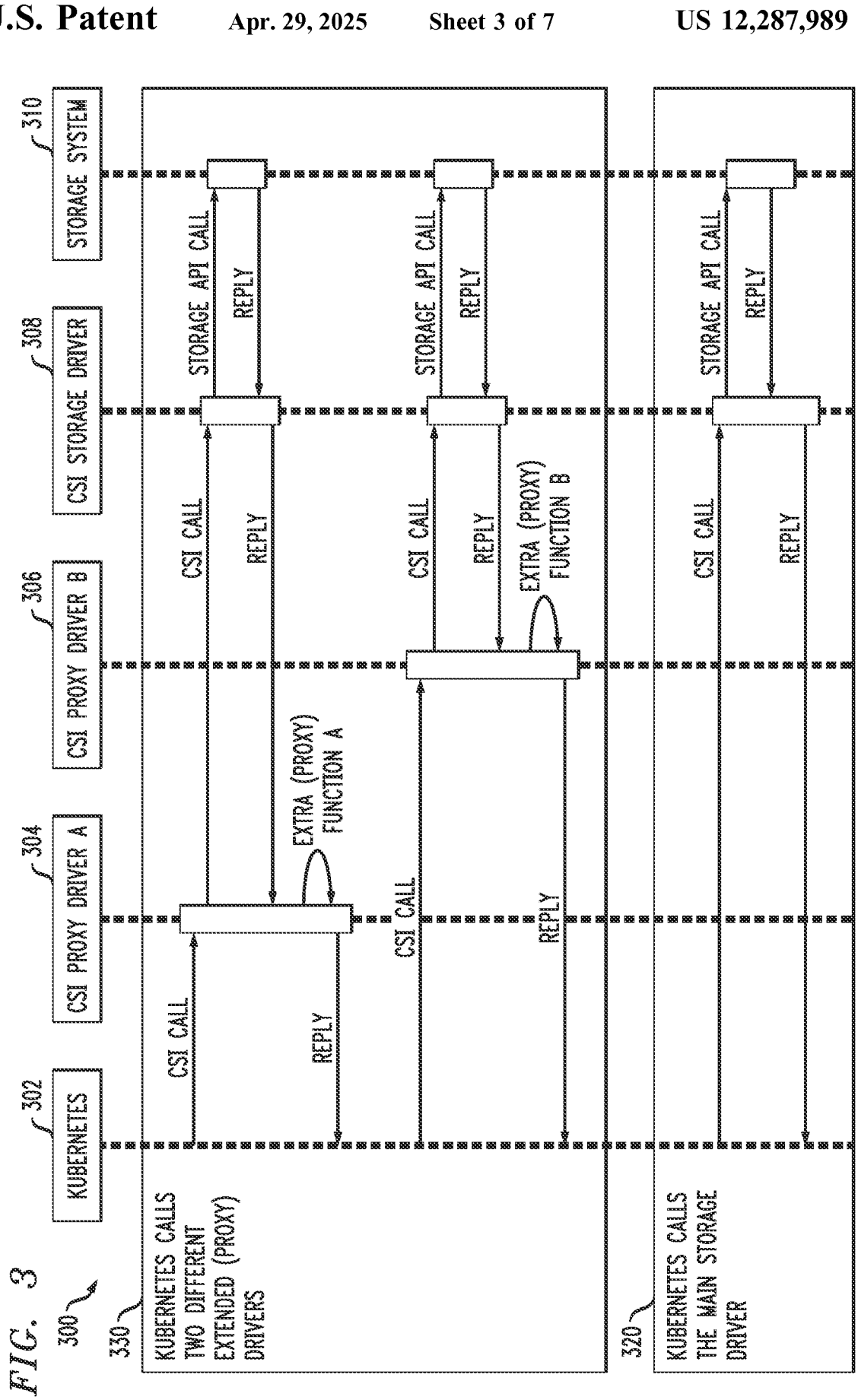
FIG. 3 illustrates a call flow associated with a multi-interface driver deployment model according to an illustrative embodiment.

Referring initially to FIG. 3, a call flow 300 associated with a multi-interface CSI driver deployment model according to an illustrative embodiment is depicted. More particularly, call flow 300 illustrates that the same CSI storage driver can be used as is by Kubernetes (call flow part 320) or via one or more different functional proxies (call flow part 330) to enable enhanced volume capabilities. As such, proxied and direct calls can be made to the CSI storage driver as illustrated in call flow 300 and as will be further described below. Note that while Kubernetes is referenced in FIG. 3 as the container orchestration implementation, the multi-interface CSI driver deployment model depicted in call flow 300 is not limited to any such container orchestration implementation.

As shown, call flow 300 involves a Kubernetes component 302, a CSI proxy driver 304 (i.e., proxy driver A), a CSI proxy driver 306 (i.e., proxy driver B), a CSI storage driver 308 (i.e., main storage driver), and a storage system 310. It is to be understood that, in accordance with the multi-interface CSI driver deployment model of this illustrative embodiment, CSI storage driver 308 is configured with multiple interfaces to respectively receive direct requests from Kubernetes component 302 (i.e., host) and proxied requests from one or more of CSI proxy driver 304 and CSI proxy driver 306 (e.g., one or more proxies).

In one non-limiting example, with reference back to FIGS. 1 and 2, Kubernetes component 302 can be considered as part of a worker node 120 executing an application on a host device 202, while CSI proxy driver 304, CSI proxy driver 306, and CSI storage driver 308 can also execute on a worker node 120 of a host device 202, wherein each worker node 120 is part of the same cluster 115. Further, a pod 122 on a worker node 120 executing CSI proxy driver 304, CSI proxy driver 306, and CSI storage driver 308 can be considered a driver pod, while a pod 122 on a worker node 120 executing Kubernetes component 302 can be considered a host pod. As explained above, one or more containers are used to execute processes on each of a driver pod and a host pod. In addition, storage system 310 in FIG. 3 may be configured as storage system 204 or as one or more individual storage arrays 205 in FIG. 2.

Starting with call flow part 320 in FIG. 3, Kubernetes component 302 sends a CSI call to CSI storage driver 308 which then sends a storage API call to storage system 310. Storage system 310 responds to the storage API call with a reply to CSI storage driver 308 which then passes the reply to Kubernetes component 302. This is an example of a direct call to CSI storage driver 308.

Further, in call flow part 330, Kubernetes component 302 sends a CSI call to CSI proxy driver 304. CSI proxy driver 304 then sends the CSI call to CSI storage driver 308 which then sends a storage API call to storage system 310. Storage system 310 responds to the storage API call with a reply to CSI storage driver 308 which then passes the reply to CSI proxy driver 304. CSI proxy driver 304 then executes an extra or extended function (proxy function A) based on the received reply and sends a reply (i.e., modified or otherwise adapted by execution of the extra function) to Kubernetes component 302. This is one example of a proxied call to CSI storage driver 308.

Similarly, in call flow part 330, Kubernetes component 302 sends a CSI call to CSI proxy driver 306. CSI proxy driver 306 then sends the CSI call to CSI storage driver 308 which then sends a storage API call to storage system 310. Storage system 310 responds to the storage API call with a reply to CSI storage driver 308 which then passes the reply to CSI proxy driver 306. CSI proxy driver 306 then executes an extra or extended function (proxy function B) based on the received reply and sends a reply (i.e., modified or otherwise adapted by execution of the extra function) to Kubernetes component 302. This is another example of a proxied call to CSI storage driver 308.

It is to be appreciated that CSI proxy driver 304 and CSI proxy driver 306 do not have to map CSI calls one-to-one. Additionally or alternatively, CSI proxy driver 304 and/or CSI proxy driver 306 may: (i) send multiple (different) calls to CSI storage driver 308 when processing a single call from Kubernetes component 302; (ii) validate and reject a call from Kubernetes component 302 without any further processing; and/or (iii) service a call from Kubernetes component 302 on its own without calling to CSI storage driver 308. A wide variety of other use cases can be implemented.

While FIG. 3 illustrates two proxy drivers A and B (CSI proxy driver 304 and CSI proxy driver 306), it is to be appreciated that in alternative implementations, based on specific use cases, one or more than two proxy drivers can be created in accordance with alternative illustrative embodiments.

Figure 4:
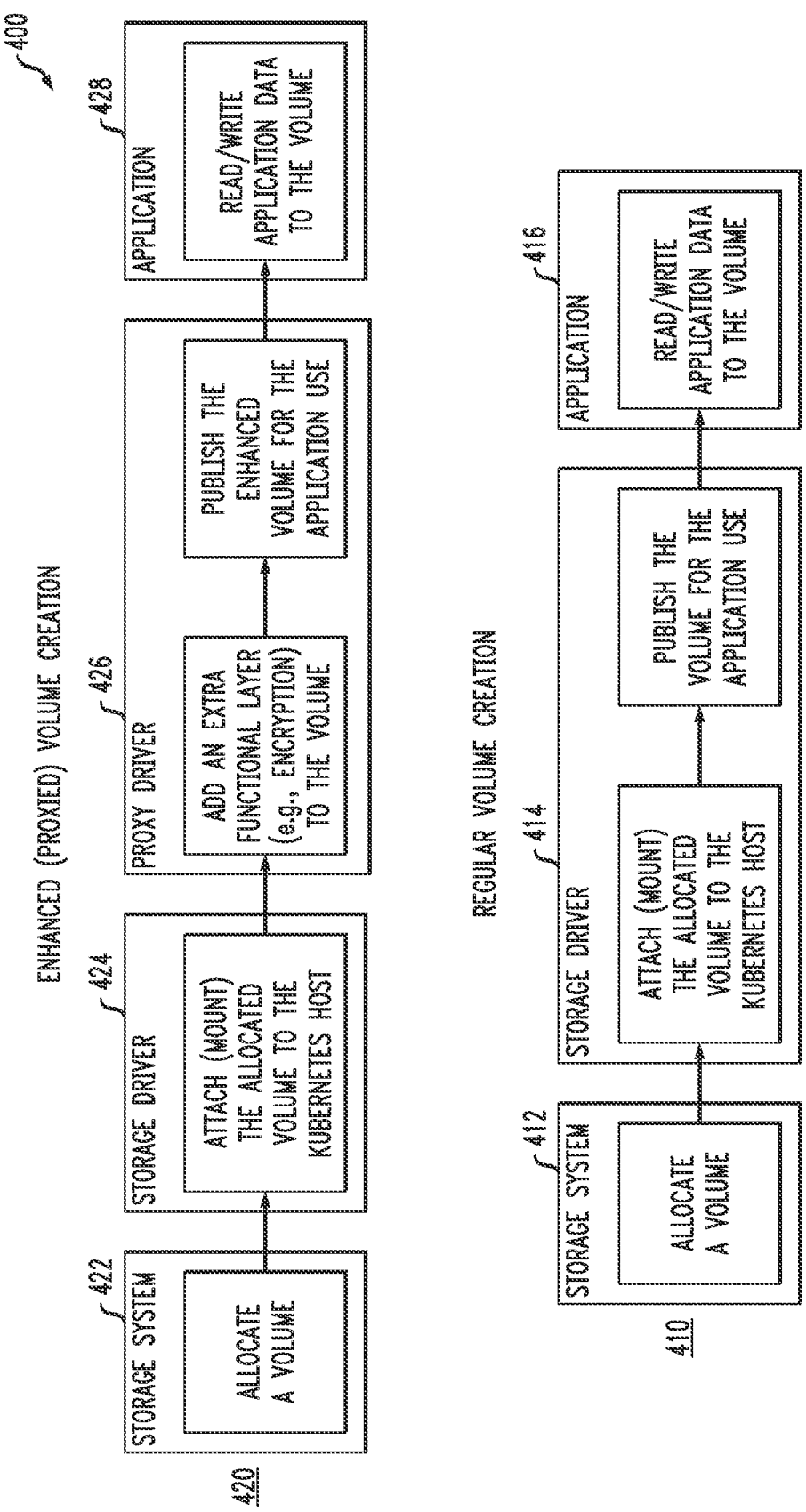
FIG. 4 illustrates a process flow associated with a multi-interface driver deployment model according to an illustrative embodiment.

Referring now to FIG. 4, a process flow 400 associated with a multi-interface CSI driver deployment model according to an illustrative embodiment is depicted. More particularly, process flow 400 shows steps/operations executed by different components when Kubernetes requests a new regular volume (process flow part 410) or a new enhanced volume (process flow part 420). Note that, in a non-limiting example, the components that execute steps/operations of process flow 400 as shown in FIG. 4 may be understood to refer to the similarly named components referenced in FIG. 3. Thus, "storage system" in FIG. 4 may refer to storage system 310 in FIG. 3, "storage driver" in FIG. 4 may refer to CSI storage driver 308 in FIG. 3, "proxy driver" in FIG. 4 may refer to one of CSI proxy driver 304 or CSI proxy driver 306 in FIG. 3, and "application" in FIG. 4 may refer to Kubernetes component 302 in FIG. 3.

With respect to process flow part 410 (regular volume creation), assume that Kubernetes component 302, in accordance with an application executing thereon, requests creation of a regular volume on storage system 310. Accordingly, in step 412, storage system 310 allocates a storage volume (allocated volume). In step 414, CSI storage driver 308 attaches (mounts) the allocated volume to the Kubernetes host (host device on which Kubernetes component 302 resides) and then publishes the volume for use by the application executing on Kubernetes component 302. In step 416, the application executing on Kubernetes component 302 can read/write application data to the volume.

With respect to process flow part 420 (enhanced or proxied volume creation), assume that Kubernetes component 302, in accordance with an application executing thereon, requests creation of an enhanced volume on storage system 310. The enhanced volume is a volume that corresponds with an added (enhanced) functionality that the proxy driver (CSI proxy driver 304 or CSI proxy driver 306) is configured to provide. Accordingly, in step 422, storage system 310 allocates a storage volume (allocated volume). In step 424, CSI storage driver 308 attaches (mounts) the allocated volume to the Kubernetes host (host device on which Kubernetes component 302 resides). In step 426, the proxy driver (one of CSI proxy driver 304 or CSI proxy driver 306) adds an extra functional layer (e.g., encryption) to the volume and then publishes the enhanced volume for use by the application executing on Kubernetes component 302. In step 428, the application executing on Kubernetes component 302 can read/write application data to the volume.

Figure 5:
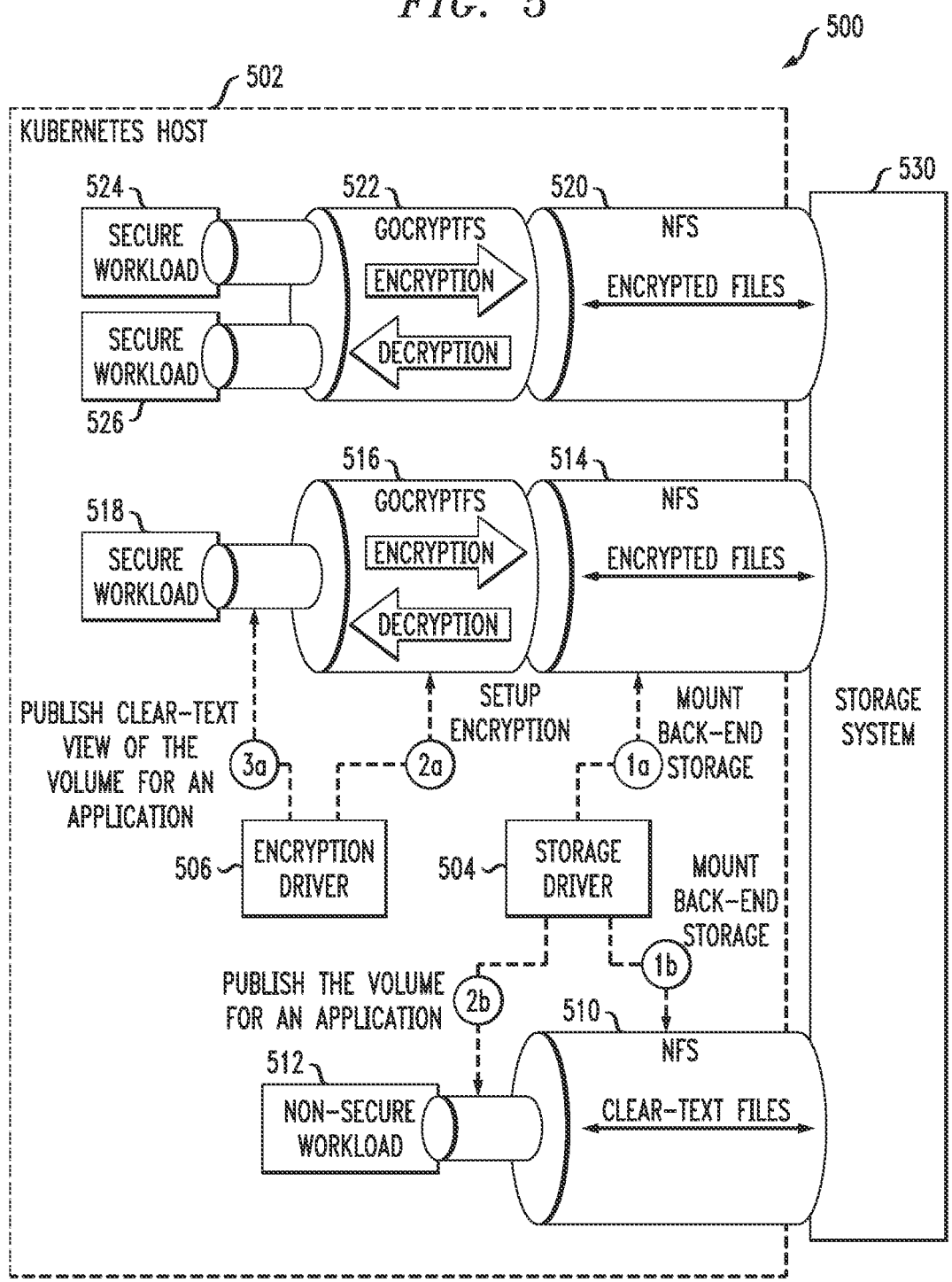
FIG. 5 illustrates a data path architecture associated with a multi-interface driver deployment model according to an illustrative embodiment.
Figure 6:
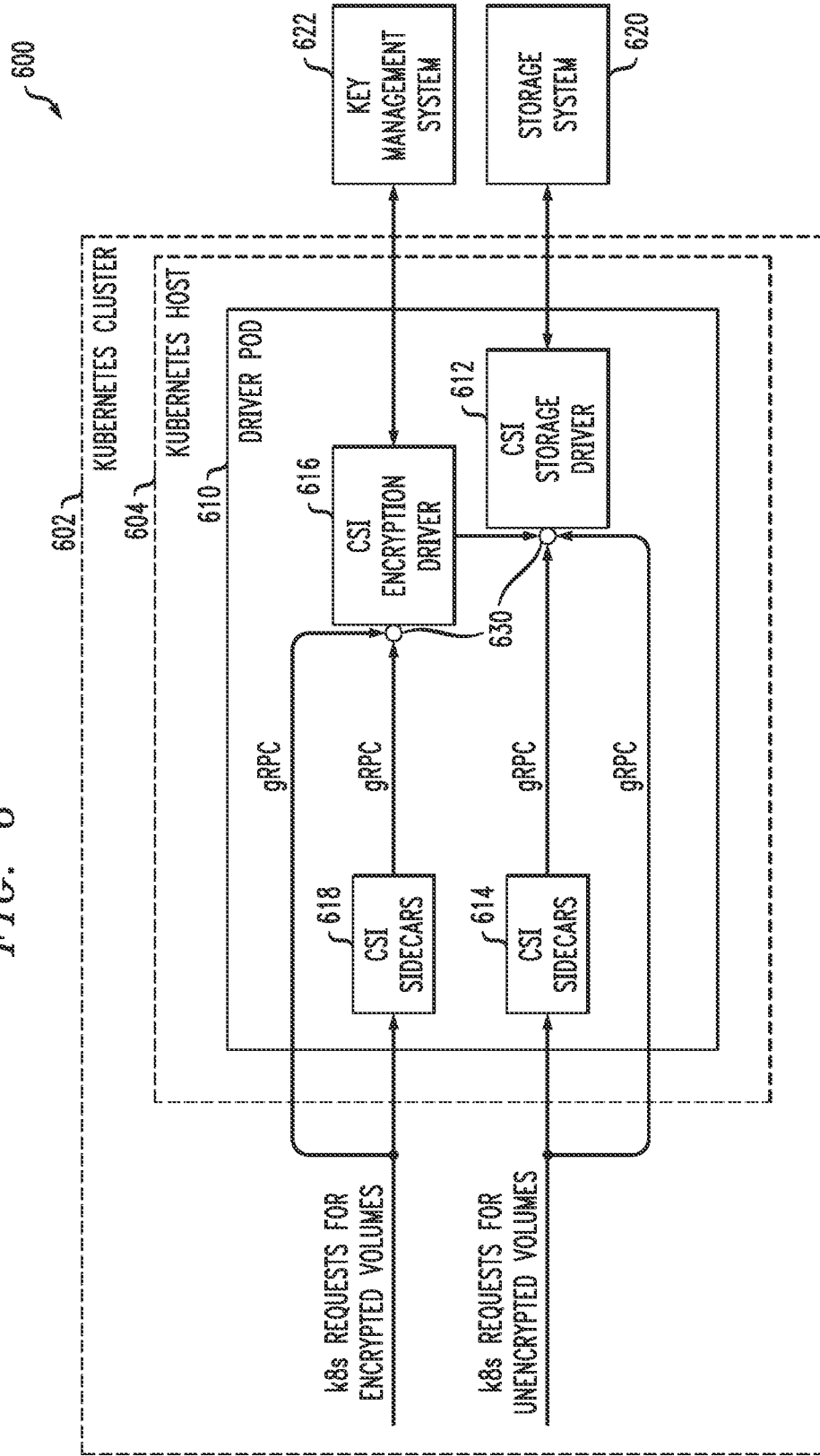
FIG. 6 illustrates a control path architecture associated with a multi-interface driver deployment model according to an illustrative embodiment.

Referring now to FIGS. 5 and 6, a further example of a multi-interface CSI driver deployment model according to an illustrative embodiment is depicted. More particularly, FIGS. 5 and 6 depict an illustrative embodiment wherein the added (enhanced) functionality provided by a proxy driver is a cryptographic functionality (e.g., encryption and decryption). As such, a corresponding storage system may be configured to store a volume containing an unencrypted version (e.g., clear text files) of some application workload data, as well as a volume containing an encrypted version (e.g., encrypted files) of some application workload data. FIG. 5 illustrates a data path diagram associated with a multi-interface CSI driver deployment architecture, while FIG. 6 illustrates a corresponding control path diagram.

For example, consistent with illustrative embodiments of FIGS. 3 and 4 described above, assume the proxy driver is configured to process Kubernetes CSI requests autonomously or forward Kubernetes CSI requests to the main storage driver, e.g., to provision a new storage volume on the storage array or create a volume snapshot. Thus, the proxy driver can process Kubernetes requests which may include making its own CSI requests to the storage driver. By way of one non-limiting example, assume a CSM for encryption registers an encryption driver, and the encryption driver uses a storage driver (e.g., Dell PowerScale driver) as a backend driver. The storage driver provisions a regular unencrypted volume on behalf of the encryption driver, then the encryption driver initializes the volume for encryption, thus fulfilling the Kubernetes request. Any Kubernetes requests for unencrypted volumes go directly to the storage driver. This exemplary process flow is shown in further detail in the context of FIGS. 5 and 6.

Referring now to FIG. 5, a data path architecture 500 comprises a Kubernetes host 502 operatively coupled to a storage system 530. By way of example only, Kubernetes host 502 can refer to a host device 202 in FIG. 2 running an application, while storage system 530 may be configured as storage system 204 or as one or more individual storage arrays 205 in FIG. 2 upon which storage volumes (encrypted and unencrypted) are stored and accessible via various data paths.

More particularly, as shown, a storage driver 504 and an encryption driver 506 (created as explained herein in accordance with one or more illustrative embodiments) reside on Kubernetes host 502, along with: (i) a first data path formed by a network file system (NFS) 510 configured to enable access of clear-text files, associated with a non-secure workload 512, on storage system 530; (ii) a second data path formed by an NFS 514 and an encrypted overlay file system 516 configured to enable access of encrypted files, associated with a secure workload 518, on storage system 530; and (iii) a third data path formed by an NFS 520 and an encrypted overlay file system 522 configured to enable access of encrypted files, associated with secure workloads 524 and 526, on storage system 530. It is to be appreciated that in one non-limiting example, encrypted overlay file systems 516 and 522 can be written in the Go open-source programming language (wherein an encrypted overlay file system is referred to as gocryptfs) and can utilize Go remote procedure calls (referred to as gRPCs) as will be further illustrated in the context of FIG. 6.

As further shown, steps 1a (mount back-end storage), 2a (setup encryption), and 3a (publish clear-text view of the volume for an application) generally summarize the sequence of steps/operations of forming a data path for an encrypted volume, whereas the data path for an unencrypted volume is created in steps/operations 1b (mount back-end storage) and 2b (publish the volume for an application).

Turning now to FIG. 6, a control path architecture 600, corresponding to data path architecture 500 of FIG. 5, is depicted. As shown, a Kubernetes cluster 602 comprises a Kubernetes host 604 (corresponding to Kubernetes host 502) which comprises a driver pod 610. Driver pod 610 comprises a CSI storage driver 612 (corresponding to storage driver 504) with one or more CSI sidecars 614, and an CSI encryption driver 616 (corresponding to encryption driver 506) with CSI sidecars 618. As further shown, a storage system 620 (corresponding to storage system 530) is operatively coupled to CSI storage driver 612, and a key management system 622 is operatively coupled to CSI encryption driver 616. Key management system 622 is configured to manage cryptographic keys used by CSI encryption driver 616 to encrypt/decrypt data.

Both CSI storage driver 612 and CSI encryption driver 616 are configured to expose Unix domain sockets, referenced as circles 630 in FIG. 6, through which they receive CSI requests over gRPCs as mentioned above. Advantageously, CSI storage driver 612 is agnostic to the additional functionality provided by CSI encryption driver 616. More particularly, CSI storage driver 612 is unaware of CSI encryption driver 616 and thus does not distinguish between requests from Kubernetes (k8s) and from CSI encryption driver 616.

It is to be appreciated that CSI sidecars 614, corresponding to CSI storage driver 612, and CSI sidecars 618, corresponding to CSI encryption driver 616, are auxiliary containers used by CSI driver deployments to facilitate the functionality of the corresponding CSI driver. Such CSI sidecars may be considered part of a Kubernetes CSI interface.

It is to be appreciated that while FIGS. 5 and 6 refer to the proxy driver providing a cryptographic function (encryption/decryption), illustrative embodiments are not intended to be limited thereto. For example, a proxy driver created in a multi-interface CSI driver deployment model according to other illustrative embodiments can comprise one or more functionalities including, but not limited to, any data transformation function, any data flow function, any volume provisioning function, any data security function, to name a few.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement a multi-interface CSI driver deployment model according to illustrative embodiments will now be described in greater detail with reference to FIGS. 7 and 8. Although described in the context of systems and processes of FIGS. 1-6, these platforms may also be used to implement at least portions of other information processing systems in other embodiments.

Figure 7:
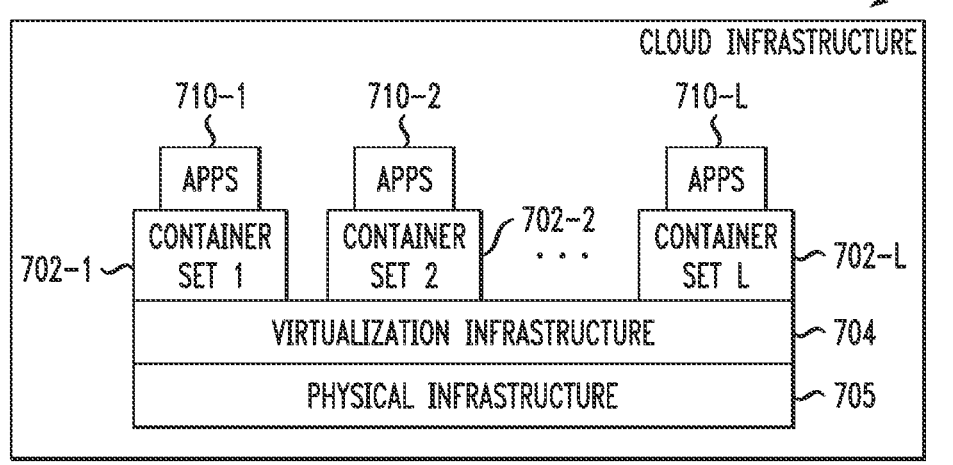
FIGS. 7 and 8 show examples of processing platforms that may be utilized to implement at least a portion of an information processing system with a multi-interface driver deployment model according to illustrative embodiments.
Figure 8:
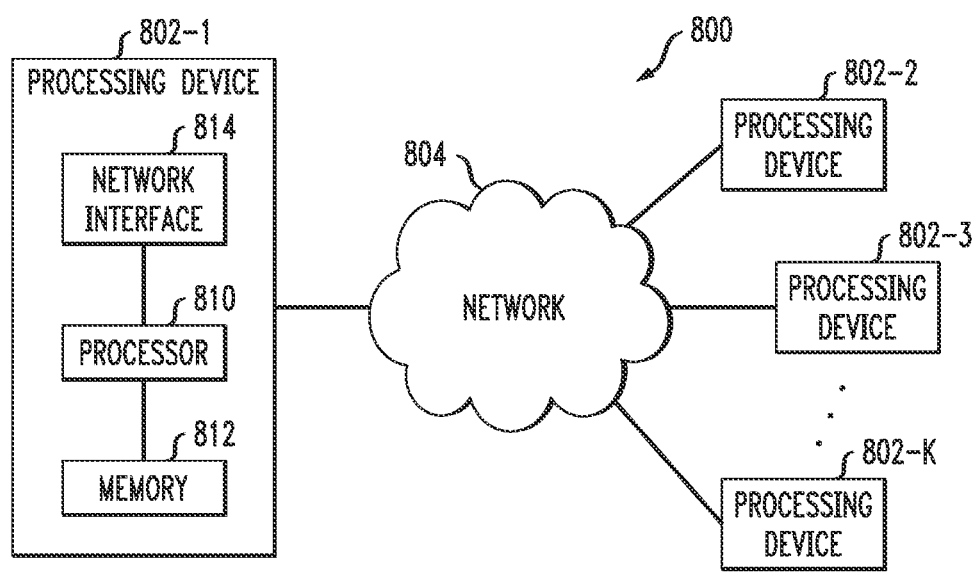

FIG. 7 shows an example processing platform comprising cloud infrastructure 700. The cloud infrastructure 700 comprises a combination of physical and virtual processing resources that may be utilized to implement at least a portion of the information processing systems described herein. The cloud infrastructure 700 comprises multiple container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure.

The cloud infrastructure 700 further comprises sets of applications 710-1, 710-2, . . . 710-L running on respective ones of the container sets 702-1, 702-2, . . . 702-L under the control of the virtualization infrastructure 704. The container sets 702 may comprise respective sets of one or more containers.

In some implementations of the FIG. 7 embodiment, the container sets 702 comprise respective containers implemented using virtualization infrastructure 704 that provides operating system level virtualization functionality, such as support for Kubernetes-managed containers.

As is apparent from the above, one or more of the processing modules or other components of the information processing systems described herein may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of information processing systems described herein and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and systems and processes of FIGS. 1-6 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to at least one memory, the at least one processing platform, when executing program code, is configured to implement a first container storage interface driver, wherein the first container storage interface driver comprises multiple interfaces and is configured to:
   receive a first request from a host configured to execute an application program, wherein the first request is related to a first storage volume associated with a storage system;
   receive a second request from a second container storage interface driver configured to provide an additional functionality with respect to the first container storage interface driver, wherein the second request is related to a second storage volume associated with the storage system; and
   send the first request and the second request to the storage system.

2. The apparatus of claim 1, wherein the first container storage interface driver is further configured to:
   receive a first response to the first request from the storage system; and
   send the first response to the host.

3. The apparatus of claim 2, wherein the first container storage interface driver is further configured to:
   receive a second response to the second request from the storage system; and
   send the second response to the second container storage interface driver.

4. The apparatus of claim 1, wherein the first container storage interface driver is further configured to:
   initially receive an allocation request from the host to allocate one of the first storage volume and the second storage volume; and
   allocate a volume as one of the first storage volume and the second storage volume.

5. The apparatus of claim 4, wherein:
   when the allocated volume is the first storage volume, the first container storage interface driver publishes the first storage volume for use by the application program; and
   when the allocated volume is the second storage volume, the second container storage interface driver publishes the second storage volume for use by the application program.

6. The apparatus of claim 1, wherein the first container storage interface driver is configured to operate as a main container storage interface driver and the second container storage interface driver is configured to operate as a proxy container storage interface driver.

7. The apparatus of claim 1, wherein the first container storage interface driver is agnostic to the additional functionality provided by the second container storage interface driver.

8. The apparatus of claim 1, wherein the second request received by the first container storage interface driver, from the second container storage interface driver, originates from the host.

9. The apparatus of claim 1, wherein the additional functionality comprises one or more operations associated with the application program.

10. The apparatus of claim 1, wherein the first container storage interface driver and the second container storage interface driver are further configured to operate in a pod-based environment.

11. A method comprising:
    deploying a first container storage interface driver, wherein the first container storage interface driver comprises multiple interfaces and is configured to: (i) receive a first request from a host configured to execute an application program, wherein the first request is related to a first storage volume associated with a storage system; (ii) receive a second request from a second container storage interface driver configured to provide an additional functionality with respect to the first container storage interface driver, wherein the second request is related to a second storage volume associated with the storage system; and (iii) send the first request and the second request to the storage system;
    wherein the first container storage interface driver is implemented on a processing platform comprising at least one processor, coupled to at least one memory, executing program code.

12. The method of claim 11, wherein the first container storage interface driver is further configured to:
receive a first response to the first request from the storage system; and
send the first response to the host.

13. The method of claim 12, wherein the first container storage interface driver is further configured to:
receive a second response to the second request from the storage system; and
send the second response to the second container storage interface driver.

14. The method of claim 11, wherein the first container storage interface driver is further configured to:
initially receive an allocation request from the host to allocate one of the first storage volume and the second storage volume; and
allocate a volume as one of the first storage volume and the second storage volume.

15. The method of claim 14, wherein:
when the allocated volume is the first storage volume, the first container storage interface driver publishes the first storage volume for use by the application program; and
when the allocated volume is the second storage volume, the second container storage interface driver publishes the second storage volume for use by the application program.

16. A computer program product comprising a non-transitory processor-readable storage medium having stored therein program code of one or more software programs, wherein the program code when executed by at least one processing platform causes the at least one processing platform to:
deploy a first container storage interface driver, wherein the first container storage interface driver comprises multiple interfaces and is configured to: (i) receive a first request from a host configured to execute an application program, wherein the first request is related to a first storage volume associated with a storage system; (ii) receive a second request from a second container storage interface driver configured to provide an additional functionality with respect to the first container storage interface driver, wherein the second request is related to a second storage volume associated with the storage system; and (iii) send the first request and the second request to the storage system.

17. The computer program product of claim 16, wherein the first container storage interface driver is further configured to:
receive a first response to the first request from the storage system; and
send the first response to the host.

18. The computer program product of claim 17, wherein the first container storage interface driver is further configured to:
receive a second response to the second request from the storage system; and
send the second response to the second container storage interface driver.

19. The computer program product of claim 16, wherein the first container storage interface driver is further configured to:
initially receive an allocation request from the host to allocate one of the first storage volume and the second storage volume; and
allocate a volume as one of the first storage volume and the second storage volume.

20. The computer program product of claim 19, wherein:
when the allocated volume is the first storage volume, the first container storage interface driver publishes the first storage volume for use by the application program; and
when the allocated volume is the second storage volume, the second container storage interface driver publishes the second storage volume for use by the application program.

\* \* \* \* \*